(12) United States Patent
Rotbart

(10) Patent No.: US 6,285,976 B1
(45) Date of Patent: *Sep. 4, 2001

(54) DEVICE FOR IMPLEMENTING HIERARCHICAL STATE CHARTS AND METHODS AND APPARATUS USEFUL THEREFOR

(75) Inventor: Federick C. Rotbart, Misgav (IL)

(73) Assignee: Emultek Ltd., Misgave (IL)

( * ) Notice: Subject to any disclaimer, the term of this patent is extended or adjusted under 35 U.S.C. 154(b) by 0 days.

This patent is subject to a terminal disclaimer.

(21) Appl. No.: 09/450,060

(22) Filed: Nov. 29, 1999

Related U.S. Application Data

(63) Continuation of application No. 08/868,278, filed on Jun. 3, 1997, now Pat. No. 5,995,739.

(30) Foreign Application Priority Data

Dec. 25, 1996 (IL) .................................................. 119914

(51) Int. Cl.$^7$ ................................................ G05B 19/045
(52) U.S. Cl. ............................. 703/17; 714/38; 714/39
(58) Field of Search ...................... 703/17, 13; 716/5; 717/2; 345/302; 709/228, 318; 702/57; 700/12; 714/37, 38, 39, 49, 50, 51

(56) References Cited

U.S. PATENT DOCUMENTS

| | | | |
|---|---|---|---|
| 4,799,141 | 1/1989 | Drusinsky et al. | 700/12 |
| 5,163,016 | 11/1992 | Har'el et al. | 716/5 |
| 5,257,363 | 10/1993 | Shapiro et al. | 703/13 |
| 5,485,600 | 1/1996 | Joseph et al. | 703/13 |
| 5,493,680 | 2/1996 | Danforth | 717/2 |
| 5,652,714 | 7/1997 | Peterson et al. | 702/57 |
| 5,727,214 | 3/1998 | Allen | 709/318 |
| 5,801,687 | 9/1998 | Peterson et al. | 345/302 |
| 5,826,030 | 10/1998 | Hebert | 709/228 |
| 5,995,739 | * 11/1999 | Rotbart | 703/17 |

FOREIGN PATENT DOCUMENTS 0 597 646    5/1994 (EP) .

OTHER PUBLICATIONS

Harel, D., "Statecharts, A Visual Approach to Complex Systems", Science of Computer Programming, vol. 8, 1987, pp. 231–274.

Drusinsky–Yoresh, Doron, "A State Assignment Procedure for Single–Block Implementation of State Charts" Short Papers, *IEEE Transactions on Computer–Aided Design*, vol. 10, No. 12, Dec. 1991., pp.1569–1576.

Harel, D. et al., "Statemate: A Working Environment for the Development of Complex Reactive Systems", Proceedings of the 10$^{th}$ International Conference on Software Engineering, 1988, pp. 396–406.

(List continued on next page.)

Primary Examiner—Kevin J. Teska
Assistant Examiner—Russell W. Frejd
(74) Attorney, Agent, or Firm—Helfgott & Karas, P.C.

(57) ABSTRACT

The present invention discloses apparatus implementing hierarchical state charts and including a state machine engine (SME) operative to carry out repertoires of behaviors of a system, a state chart encoder operative to replicate, in computer code form, a user-defined hierarchical state chart describing a repertoire of behaviors of the system, the encoder being operative to preserve the state chart's hierarchical structure intact in a first data structure, an event list generator operative to generate, for each individual event from among a plurality of events within the repertoire, a list of at least one transition between states of the state chart which are associated with the individual event, the event list generator being operative to preserve the list in a second data structure, and a behavior implementer operative to activate the system to carry out each of the behaviors in its repertoire.

11 Claims, 7 Drawing Sheets

OTHER PUBLICATIONS

Jarvinen, H. et al., "DisCo Specific Language: Marriage of Actions and Objects", 11$^{th}$ International Conference on Distributed Computing Systems, 1991, pp. 142–151.

Koskimies, K. et al., "Automatic Synthesis of State Machines from Trace Diagrams", *Software Practice & Experience*, GB, vol. 24, No. 7, Jul. 1, 1994, pp. 643–658.

Ziomek, T., "Efficient, Maintainable Implementation of State Machines in Software", *Motorola Technical Developments*, US., vol. 23, Oct. 1994, pp. 70–72.

Pulli, P., "Embedded Microcontroller Operating System with State–Machine Support", *Microprocessing and Microprogramming*, Netherlands, vol. 18, No. 1–5, Dec. 1986, pp. 59–62.

* cited by examiner

DEVICE FOR IMPLEMENTING HIERARCHICAL STATE CHARTS AND METHODS AND APPARATUS USEFUL THEREFOR

This application is a Continuation of Ser. No. 08/868,278, filed on Jun. 3, 1997, now U.S. Pat. No. 5,995,739.

FIELD OF THE INVENTION

The present invention relates to computer code and to apparatus and methods for computer code generation.

BACKGROUND OF THE INVENTION

Hierarchical state charts are described in "Statecharts, a visual approach to complex systems", David Harel, Science of Computer Programming, 1987.

The disclosures of all publications mentioned in the specification and of the publications cited therein are hereby incorporated by reference.

SUMMARY OF THE INVENTION

The present invention seeks to provide improved computer code and improved apparatus and methods for computer code generation.

There is thus provided in accordance with a preferred embodiment of the present invention apparatus implementing hierarchical state charts and including a state machine engine (SME) operative to carry out repertoires of behaviors of a system, a state chart encoder operative to replicate, in computer code form, a user-defined hierarchical state chart describing a repertoire of behaviors of the system, the encoder being operative to preserve the state chart's hierarchical structure intact in a first data structure, an event list generator operative to generate, for each individual event from among a plurality of events within the repertoire, a list of at least one transition between states of the state chart which are associated with the individual event, the event list generator being operative to preserve the list in a second data structure, and a behavior implementer operative to activate the system to carry out each of the behaviors in its repertoire.

Further in accordance with a preferred embodiment of the present invention the system includes at least one of hardware and software.

Still further in accordance with a preferred embodiment of the present invention the first data structure's size increases linearly in direct proportion to the number of branches in the hierarchical structure.

Additionally in accordance with a preferred embodiment of the present invention the second data structure's size increases linearly in direct proportion to the number of transitions in the list of at least one transition.

Moreover in accordance with a preferred embodiment of the present invention the order of the at least one transition of each of the lists corresponds to the order of evaluation of the transitions as defined by the hierarchical state chart.

Further in accordance with a preferred embodiment of the present invention the plurality of events for which the event list generator generates lists includes at least one external input event.

Still further in accordance with a preferred embodiment of the present invention the plurality of events for which the event list generator generates lists includes at least one internal data value change event, the apparatus also including a data value change event notifier operative to generate a notification to the state machine engine of each data value change event.

There is additionally provided in accordance with a preferred embodiment of the present invention a method implementing hierarchical state charts, the method including providing a state machine engine (SME) operative to carry out repertoires of behaviors of a system replicating, in computer code form, a user-defined hierarchical state chart describing a repertoire of behaviors of the system, the replicating step being operative to preserve the state chart's hierarchical structure intact, generating, for each individual event from among a plurality of events within the repertoire, a list of at least one transition between states of the state chart which are associated with the individual event, and activating the system to carry out each of the behaviors in its repertoire.

There is additionally provided in accordance with a preferred embodiment of the present invention an automatic code generation method including automatically generating code which forms, in memory, a replica of a hierarchical state chart which preserves the chart's hierarchical structure, automatically generating code which forms, for each of a first plurality of input events, a list of transitions affected by that input event, automatically generating code which forms, for each of a second plurality of internal data variables, a list of transitions affected by changes in that internal data variable, automatically generating code which notifies the state machine engine of changes in internal data variables, and automatically generating code which evaluates conditions and implements actions and activities.

Further in accordance with a preferred embodiment of the present invention the method includes the step of providing a state machine engine operative, upon receipt of notification regarding occurrence of an event, to evaluate a list of transitions affected by the event so as to select transitions to be performed, and to perform the transitions.

There is additionally provided in accordance with a preferred embodiment of the present invention a method for computing a state for a hierarchical state machine, the method including providing a state machine engine operative to receive notification regarding occurrence of at least one event, providing a hierarchical state chart describing a repertoire of behaviors of a system, providing a list of at least one transition between states of the state chart for each of the events with which the at least one transition is associated, evaluating the list of at least one transition so as to select a transition to be performed in response to the at least one event, and evaluating the hierarchical state chart to compute the state that corresponds to the selected transition.

BRIEF DESCRIPTION OF THE DRAWINGS

The present invention will be understood and appreciated from the following detailed description, taken in conjunction with the drawings in which.

DETAILED DESCRIPTION OF PREFERRED EMBODIMENTS

Figure 1:
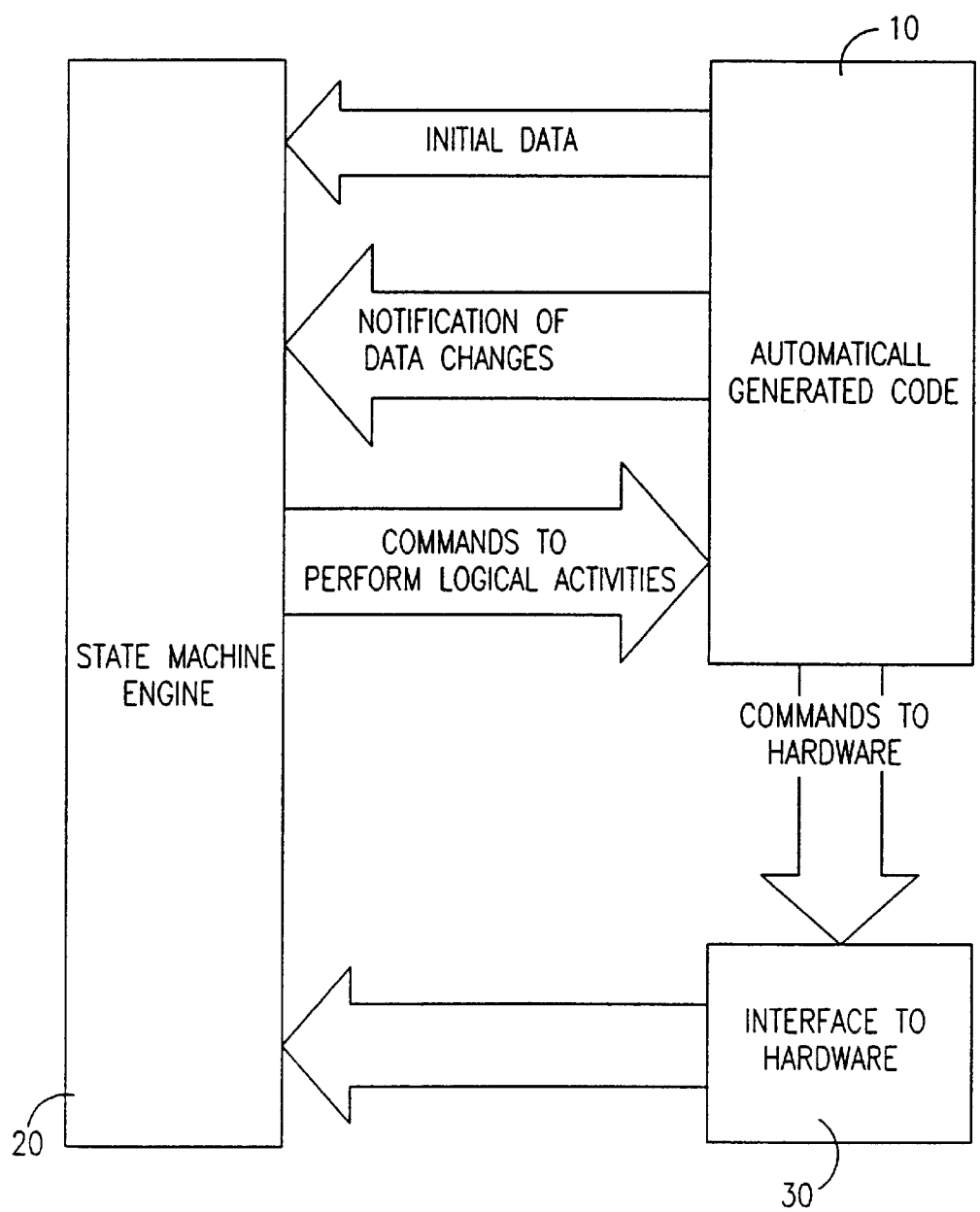
FIG. 1 is a simplified block diagram of a software system constructed and operative in accordance with a preferred embodiment of the present invention which includes automatically generated code which interfaces with a state machine engine (SME)

Reference is now made to FIG. 1 which is a simplified block diagram of a software system constructed and operative in accordance with a preferred embodiment of the present invention which includes automatically generated code 10 which interfaces with a state machine engine (SME) 20. An optional interface 30 to underlying hardware (not shown) is also provided.

The state machine engine 20 is a pre-built object code module that is linked, either dynamically or statically, to the automatically generated code and the interface library.

The state machine engine implements the behavior of the software system preferably as defined solely by the automatically generated code that is linked with it. That being the case, the state machine engine code is typically provided only once in object code form, and does not need to be changed per software system.

The state machine implements this behavior by converting input events and changes of data values into transitions within the hierarchical state chart, and then implementing these transitions. It does this by computing the new state associated with this transition, deactivates the relevant parts of the old state and finally activates the relevant parts of the new state.

Figure 2:
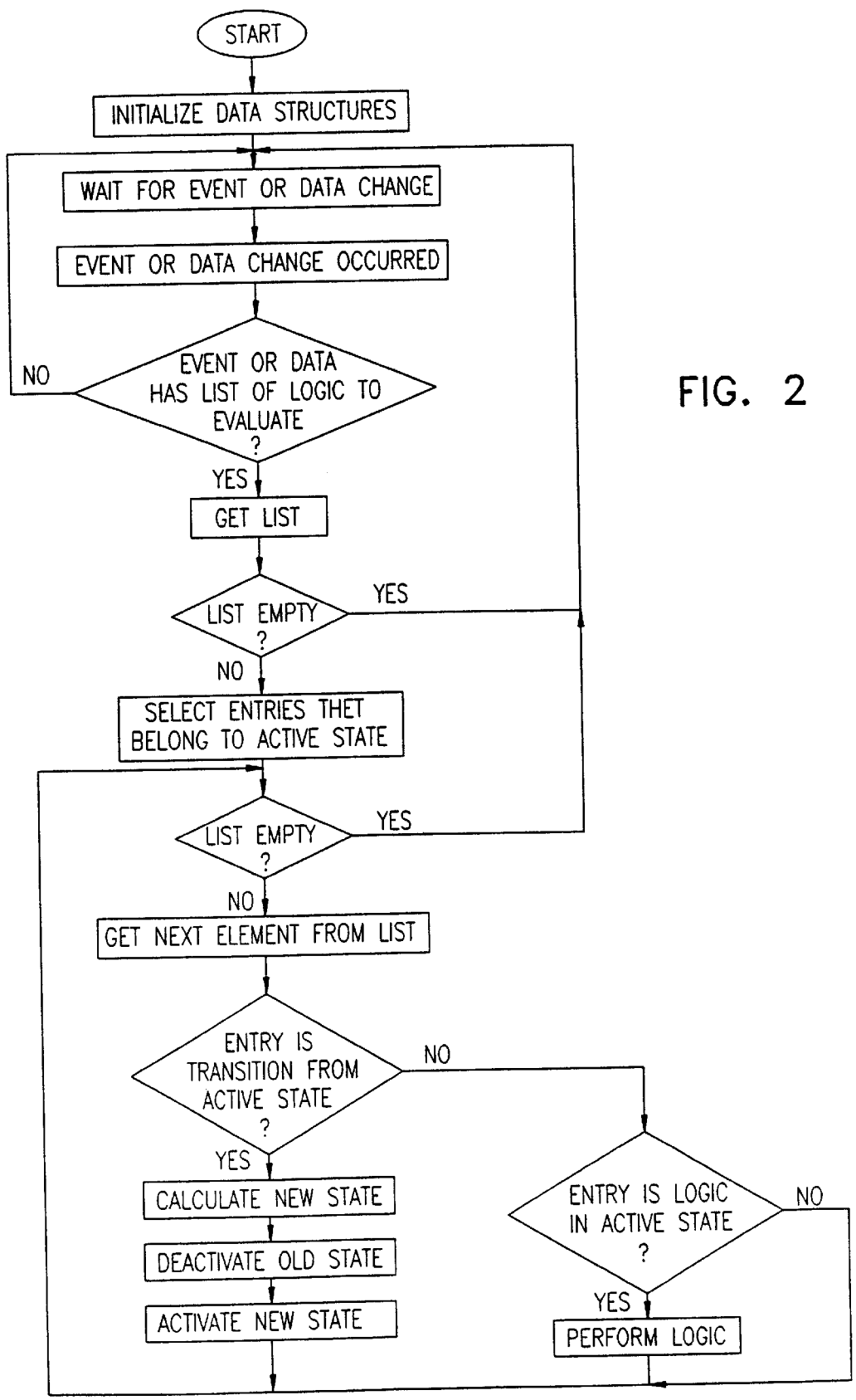
FIG. 2 is a simplified flowchart illustration of a preferred method of operation for the state machine engine of FIG. 1.

A preferred method of operation for the state machine engine (SME) 20 is described by the flow chart of FIG. 2.

The SME begins operation by building initial data structures based on data provided by the automatically generated code 30. These data structures typically include:

a data structure that is a one to one representation of the hierarchical state chart, a data structure that couples together any input events with the transitions that are triggered by these input events, a data structure that couples together any data variables in the application with transitions that are triggered by changes in the value or state of these data variables, and with any expressions that must be evaluated when these data variables change, and a pointer to all logic and activity functions within the automatically generated code.

The SME then enters its normal operating state, which is to wait for any input events or any changes in data values. It is appreciated that input events may originate from a hardware device, such as a lamp as described in greater detail hereinbelow with reference to FIG. 4, or from a software process, such as an interprocess message.

When an input event notification arrives or a data change notification arrives from the automatically generated code, SME 20 checks if the event or data structure that triggered the notification has a list of transitions or logic expressions associated with it. If not it discards the notification and returns to its normal operating state.

If the source of the notification does have such a list associated with it, the SME then checks each entry in the list and selects those entries that belong to a state that is currently active. All other entries are ignored.

The SME then iterates over the selected list and checks each entry.

If an entry is a transition, and the source state of that transition is still active, the SME performs the transition by computing the new state associated with the transition, deactivating those parts of the current state that will no longer be active in the new state, and then activating all those elements in the new state that were not active in the current state. The new state then becomes the current state.

If the entry is a logic expression, rather than a transition, the SME evaluates this expression by calling the corresponding functions in the generated code.

Once the SME has processed all entries in the list, it returns to its normal operating mode to await the next notification.

Referring back to FIG. 1, the automatically generated code 10 is a translation of a hierarchical state chart description of a system, in addition to all data elements in the system, which, when compiled and run together with the SME and the interface library, implements the behavior of the original system.

The automatically generated code 10 typically comprises some or all of the following components:

code to generate in memory, on a one to one basis, a replica of the original state chart, including the transitions and activities as defined, code to generate the lists that link sources of input events with the transitions to be evaluated when notification of these events are received by the SME, code to generate the lists that link data variables with the transitions and the logical expressions to be evaluated when notification of changes to these data variables are received by the SME, code to generate the notifications to the SME whenever a data variable changes, code to evaluate the conditions and to implement actions and activities that describe the behavior of the system described by the original state chart, including code to activate elements of hardware or software as specified by the state chart, code to deliver to the SME any of the above as is needed by it.

The object code interface library 30 to the underlying hardware is optional pre-built object code that allows one or both of the state machine and the automatically generated code to interact with the hardware on which these elements operate.

This object code interface library is specific to the hardware on which the system is to be run.

Conventional technology for generating high level code from state charts has entailed generating a static representation of all the possible transitions and states as described by the state chart, as well as generating code for the state machine that activates these various states. In general, the state and the state machine are inseparable in such generated code.

The two main techniques available for accomplishing this have been: state machines built of nested branch statements and state machines built around state transition tables.

In the first technique, code generation using branch statements, the state chart formalism is converted into a large number of typically deeply nested branch statements, where each branch statement represents one of the possible transitions. The depth of nesting is at least as deep as the deepest hierarchy in the state chart and increases non-linearly as a function of the depth of all branches in the state chart, the width of the branches and the number of possible input events.

Branch statements are statements of the type "if-else" or "switch-case".

For simple programs this may be adequate, but in general, because of the large amount of code needed to code the nested branch statements, this technique produces overly large programs.

Every possible input event is typically represented by some sort of flag. When an input event occurs, the corresponding flag is set to indicate this. The state machine mechanism involves continuously cycling through all the branch statements in the search for any branches that involve flags which may have been set before the current cycle as well as any condition statements that may have become true due to a variable changing value. This has the inevitable result that such code is very slow, especially since every cycle has to go through the deeply nested branch points that make up the code. This makes this type of code big and too slow for any application that requires a fast response time or modest memory requirements.

In the second technique, code generation using state transition tables, a procedure or function is generated for every possible transition and state, together with a state transition table that is used by the generated state machine for choosing which procedure to call for every possible external input. This state transition table is, in effect, a two-dimensional array whose indices are "input event" and "current state" and whose value is the new state.

The state here is not a hierarchical state, but rather a state in a normal linear state diagram, which is derived from the state chart by "flattening out" the original state chart.

When an input event arrives at the state machine, the state machine uses it, together with the current state to look up the next state. This use of tables results in much better response times than the nested branch statements to input. On the other hand, condition statements must still be evaluated by cycling through all such statements in search of any that evaluates to "true." This, of course, is still very slow.

In addition, because of the need to "flatten out" or linearize the original state chart, the size of the table explodes exponentially as a function of the number of possible input events, of depth of the state chart and the width of each branch. Hence, programs generated this way are normally so large as to make the generated code impractical for commercial products.

In contrast, the code generation technique of the present invention preferably has some or all of the following features:

It does not try to reproduce the hierarchical state machine in the generated code, but rather generates code that, after compilation and linkage, is run by a pre-built, optimized state machine engine.

It does not generate a static representation of all possible states and the transitions in the state chart, but rather generates code that reproduces the actual hierarchical state structure of the original state chart. The pre-built state machine engine then dynamically computes the required new state in response to every input event, or change in conditions.

It is completely event driven, even in the case of conditions. Every source of events and every variable can have a list of logic associated with it. This list points to any statement that must be evaluated if and when that event is triggered or that variable changes value. In general, the statements in the list represent transitions, and the order of the statements expresses the order of evaluation of these transitions. As soon as an input event arrives, or a variable changes value, the transition dependent upon it is immediately identified and evaluated.

The size of the generated code is linear in the number of branches and the number of transitions between the branches. The size is independent of the width of the branches and the number of possible input events.

The code generation technique of the present invention and the code structure of the present invention preferably has some or all of the following advantages:

The resultant generated code, together with the pre-built state machine engine, is very small, and has memory requirements which are comparable to equivalent code developed manually by programmers.

Whereas response time of the generated code to input events is as good as conventional automatically generated code, the response time to changes in variables is better than that for automatically generated code, and in fact, is similar to that for input events.

The code generated is guaranteed to reflect the state chart from which it was derived, rather than being a transformed version of it. As a result, the generated code behaves as described by the original state chart. In addition, because of the clarity of the state chart formalism itself, the generated code is more likely to behave as required, compared to the equivalent manually developed code.

EXAMPLE

Figure 3:
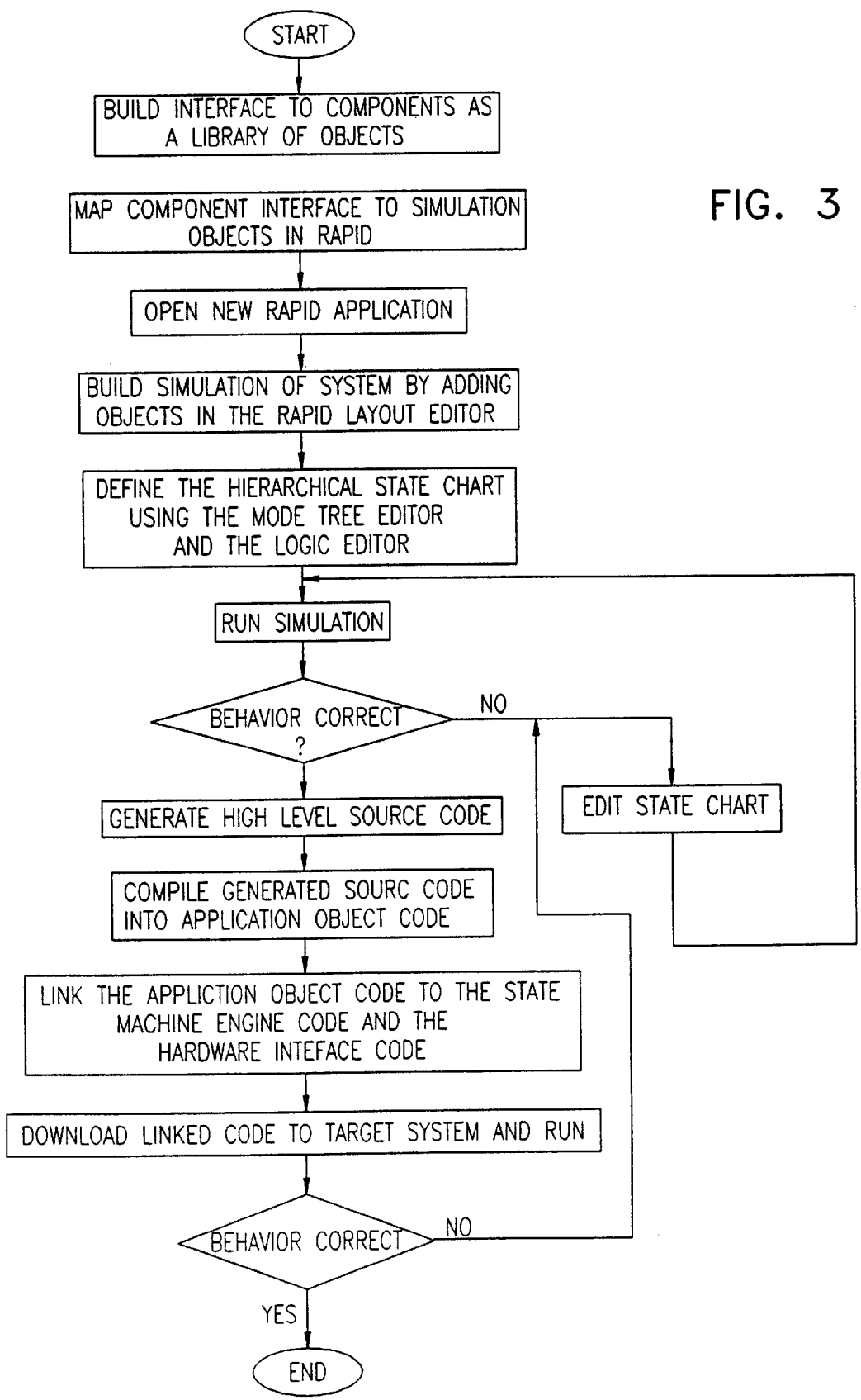
FIG. 3 is a simplified flowchart illustration of a preferred method for generating high level computer code from hierarchical state charts.

FIG. 3 illustrates incorporation of a system for generating the code shown and described herein into the Rapid S/W tool, commercially available from Emultek Ltd., Misgav 20179, Israel.

The steps of FIG. 3 are now described:

Build Interface Library

The interface library is used by the automatically generated code to interact with the hardware on which the system to be developed runs. For example, the library code may be used to request memory allocation from the operating system, or, if the hardware controls a device such as a lamp, the library might contain the code to switch the lamp on and off, e.g., by accessing certain addresses on the hardware. The library can be written in any convenient language and is preferably pre-tested before development with Rapid begins.

Map Components to Simulation Objects

In Rapid, applications are built by assembling simulations of the hardware and/or software components on the screen and building logical expressions from functions supplied with the object simulations. These supplied functions animate the behavior of the object simulations. For example in the case of a Lamp object, the function "switchOn" would cause the simulated lamp on the screen to change to the "on" color. In order for the logical expressions be able to interact with the actual components, a mapping between the supplied functions and interface library is provided. This mapping may be hard coded into the simulated objects code. Alternatively, an external textual mapping file may be used.

Open a New Rapid Application

This is the first step in building Rapid applications, providing a "clean slate" on which to build the application.

Build Simulation of the System

The simulation is built by dragging objects from a tool palette in the Layout Editor and positioning them as required on the graphic representation of the device being simulated. Each object can be graphically customized and, to some extent, functionally customized.

Rapid State Charts

The logic in a Rapid application is described by a state chart. State charts in Rapid are built from units called "modes". A mode is a functional state of the system and any mode can be hierarchically nested within any other mode. Therefore, the modes describe a hierarchical tree. Modes come in two "flavors": exclusive and concurrent. For exclusive modes, only one sibling can be in the active state at any given time, while for concurrent modes all siblings must be active together. When a particular mode is active, this implies that all its ancestors are active. If the mode's children are exclusive modes, this also implies that at least one of its children are active, while if the mode's children are concurrent modes, this implies that all of the children are active. A state in a state chart is the list of all currently active modes. A mode can have lists of activities and transitions. Activities describe what the system does when it is a particular state. Activities can be entry activities, exit activities or mode activities. Entry activities are activities that are performed when the mode that contains them becomes activate. Exit activities are activities that are performed when the mode that contains them becomes inactive. Mode activities are activities that are performed when the mode becomes active and that, as long as the mode is still active, are automatically re-evaluated whenever data variables that describe them change value. Transitions define how the system evolves from one state to another. Transitions typically have a destination mode. Transitions must also have a list of input events, or a condition expression or both. Transitions may also have a list of actions. If notification of one of the input events held by a transition is received, and that transition belongs to a currently active mode, and the condition expression, if any evaluates to true, then the mode belonging to the transition is deactivated (together with its children and any relevant ancestors) and the destination mode of the transition is activated (together with its children etc.). Between the deactivation of the original mode and the activation of the destination mode, any actions in the transition are performed.

Build the State Chart

The simulation is typically built using two tools in Rapid: the Mode Tree Editor and the Logic Editor. The Mode Tree Editor allows the user to define and add modes to the hierarchical tree of modes by selecting the parent of the new mode, specifying the type of the new mode, and giving a name to the new mode. During this process, the transitions and activities can be added and edited using the Logic Editor. As each logic expression is added to the state chart it is compiled into byte codes for a virtual machine that is used to run a simulation of the system.

Run Simulation

At any time during the development process, the simulation of the system under development can preferably be run. This allows incremental development of the system and verification that the system behaves as desired.

Generate Code

Once the developer is satisfied with the system, Rapid automatically generates C++ code for that system having the characteristics described above. It is appreciated that programming languages other than C++ may be used for the automatically generated code.

Compile the Generated Code

The automatically generated code can be compiled to produce object code.

Link With State Machine and Interface Library

The object code produced by compiling the automatically generated code is then linked with the SME object code and the interface library to produce executable code for the target system.

This executable code can be downloaded and run on the target system.

Sample Application

Figure 4:
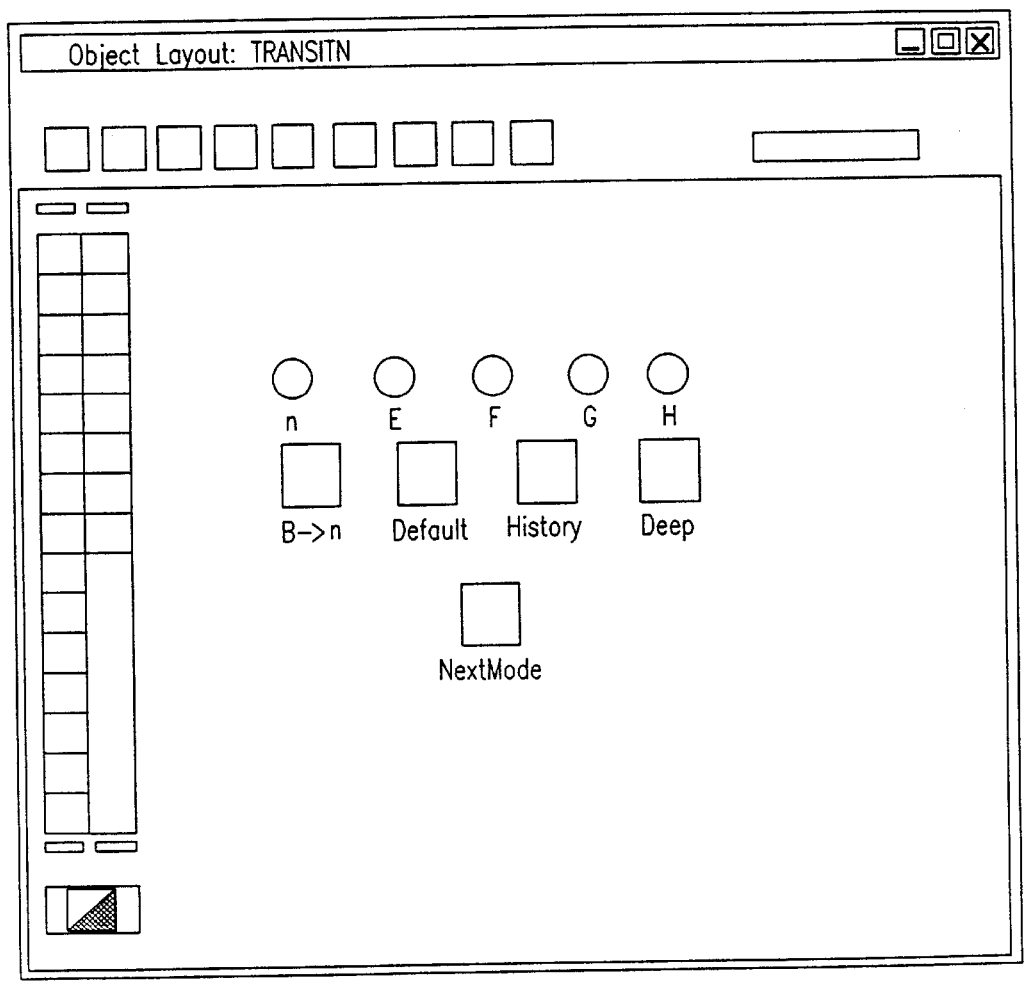
FIG. 4 is a pictorial illustration of a computer screen generated in the course of automatically generating computer code from hierarchical state charts in a particular example.

The following is a sample application in Rapid and the code automatically generated for it:

FIG. 4 is a screen capture of the application in the Layout Editor, showing the object layout.

As can be seen the application contains five lamps, and five push buttons:

Objects

RAPID APPLICATION: TRANSITN 12/12/96 16:09:08
OBJECT DATA REPORT

Parameters:
  Scope: Subtree.
  Order: Hierarchy.
  Content: Active objects, Nongraphic objects, Object parameters, Object properties.

1. OBJECT: transitn
   Parent: none Type: Root Object

Parameters:
     Position (pxl): '0 @ 0' Size (pxl): '393 @ 403'
     Dynamic: 'false'
     Drag 'n Drop: 'false'

2. OBJECT: LampH
   Parent: transitn Type: Round Lamp

Parameters:
     Center (pxl): '300 @ 139' Radius (pxl): '15 @ 15'
     Dynamic: 'false'
     Drag 'n Drop: 'false'

Properties:
   2.1. Name: blinkPeriod Type: Data
     Parameters:
       Value: 500

3. OBJECT: LampG
   Parent: transitn Type: Round Lamp

Parameters:
     Center (pxl): '243 @ 139' Radius (pxl): '15 @ 15'
     Dynamic: 'false'
     Drag 'n Drop: 'false'

Properties:
   3.1. Name: blinkPeriod Type: Data
     Parameters:
       Value: 500

4. OBJECT: LampA
   Parent: transitn Type: Round Lamp

Parameters:
   Center (pxl): '72 @ 140' Radius (pxl): '15 @ 15'
   Dynamic: 'false'
   Drag 'n Drop: 'false'

Properties:
4.1. Name: blinkPeriod Type: Data
   Parameters:
      Value: 500

5. OBJECT: LampE
   Parent: transitn Type: Round Lamp
   Parameters:
      Center (pxl): '129 @ 139' Radius (pxl): '15 @ 15'
      Dynamic: 'false'
      Drag 'n Drop: 'false'

Properties:
5.1. Name: blinkPeriod Type: Data
   Parameters:
      Value: 500

6. OBJECT: LampF
   Parent: transitn Type: Round Lamp

Parameters:
      Center (pxl): '186 @ 139' Radius (pxl): '15 @ 15'
      Dynamic: 'false'
      Drag 'n Drop: 'false'

Properties:
6.1. Name: blinkPeriod Type: Data
   Parameters:
      Value: 500

7. OBJECT: BToA
   Parent: transitn Type: Flat Pushbutton

Parameters:
      Position (pxl): '57 @ 199' Size (pxl): '40 @ 40'
      Dynamic: 'false'
      Drag 'n Drop: 'false' Momentary: 'true' Autorepeat: 'false'
      Autorepeat period: 500

8. OBJECT: Default
   Parent: transitn Type: Flat Pushbutton

Parameters:
      Position (pxl): '131 @ 199' Size (pxl): '40 @ 40'
      Dynamic: 'false'
      Drag 'n Drop: 'false' Momentary: 'true' Autorepeat: 'false'
      Autorepeat period: 500

9. OBJECT: History
   Parent: transitn Type: Flat Pushbutton

Parameters:
      Position (pxl): '206 @ 199' Size (pxl): '40 @ 40'
      Dynamic: 'false'
      Drag 'n Drop: 'false' Momentary: 'true' Autorepeat: 'false'
      Autorepeat period: 500

10. OBJECT: DeepHistory
    Parent: transitn Type: Flat Pushbutton

Parameters:
       Position (pxl): '276 @ 199' Size (pxl): '40 @ 40'
       Dynamic: 'false'
       Drag 'n Drop: 'false' Momentary: 'true' Autorepeat: 'false'
       Autorepeat period: 500

11. OBJECT: History
    Parent: transitn Type: Label

Parameters:
       Position (pxl): '198 @ 244' Size (pxl): '58 @ 15'
       Dynamic: 'false'
       Drag 'n Drop: 'false' Text: 'History' Orientation: 'Horizontal'
       Font: 'Fixedsys' Line width: 1

12. OBJECT: Next
    Parent: transitn Type: Flat Pushbutton

Parameters:
       Position (pxl): '167 @ 282' Size (pxl): '40 @ 40'
       Dynamic: 'false'
       Drag 'n Drop: 'false' Momentary: 'true' Autorepeat: 'false'
       Autorepeat period: 500

Figure 5:
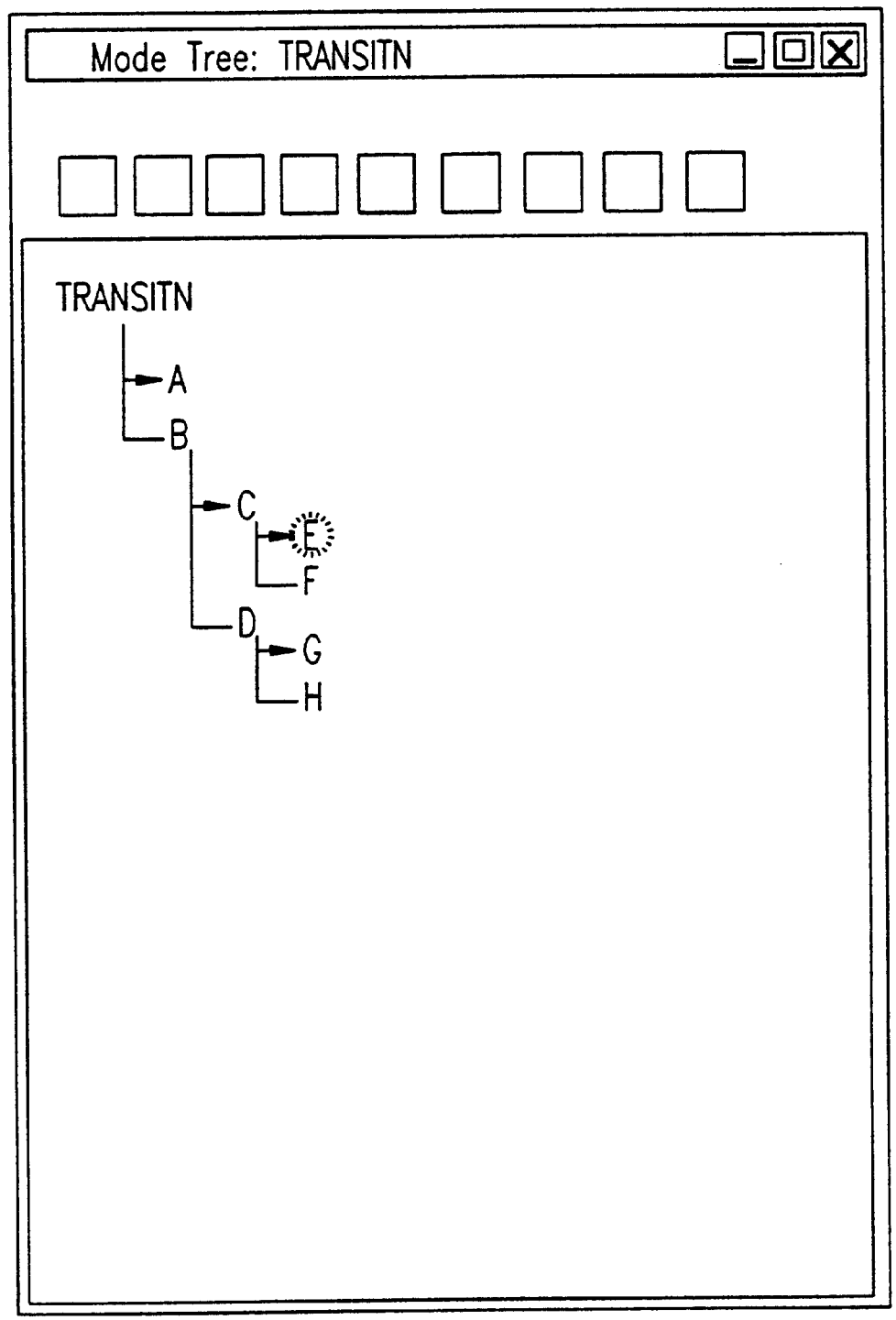
FIG. 5 is a pictorial illustration of a computer screen, generated in the course of processing the example of FIG. 4, which shows all modes making up the state chart of the example.

FIG. 5 is a screen capture of the Mode Tree Editor showing all the modes that make up the state chart of this sample application. As can be seen there are nine modes in this application.

Figure 6:
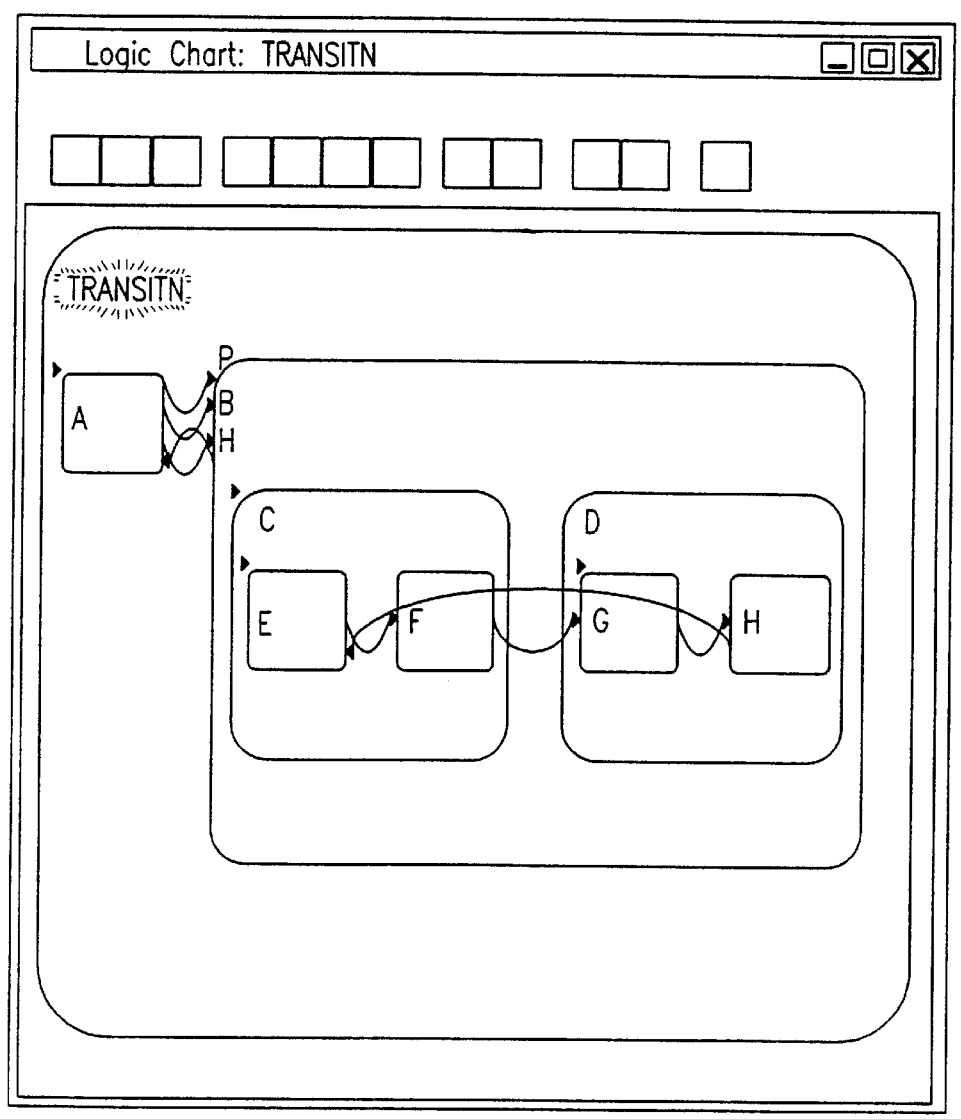
FIG. 6 is a pictorial illustration of a computer screen, generated in the course of processing the example of FIG. 4, which shows an alternative presentation of the state chart of FIG. 5.

An alternative view of the state chart can be seen in the screen capture of the Logic Chart tool shown in FIG. 6. FIG. 6 shows each mode as a rectangle and each transition as an arc. The hierarchical nature of the state is clearly seen.

Figure 7:
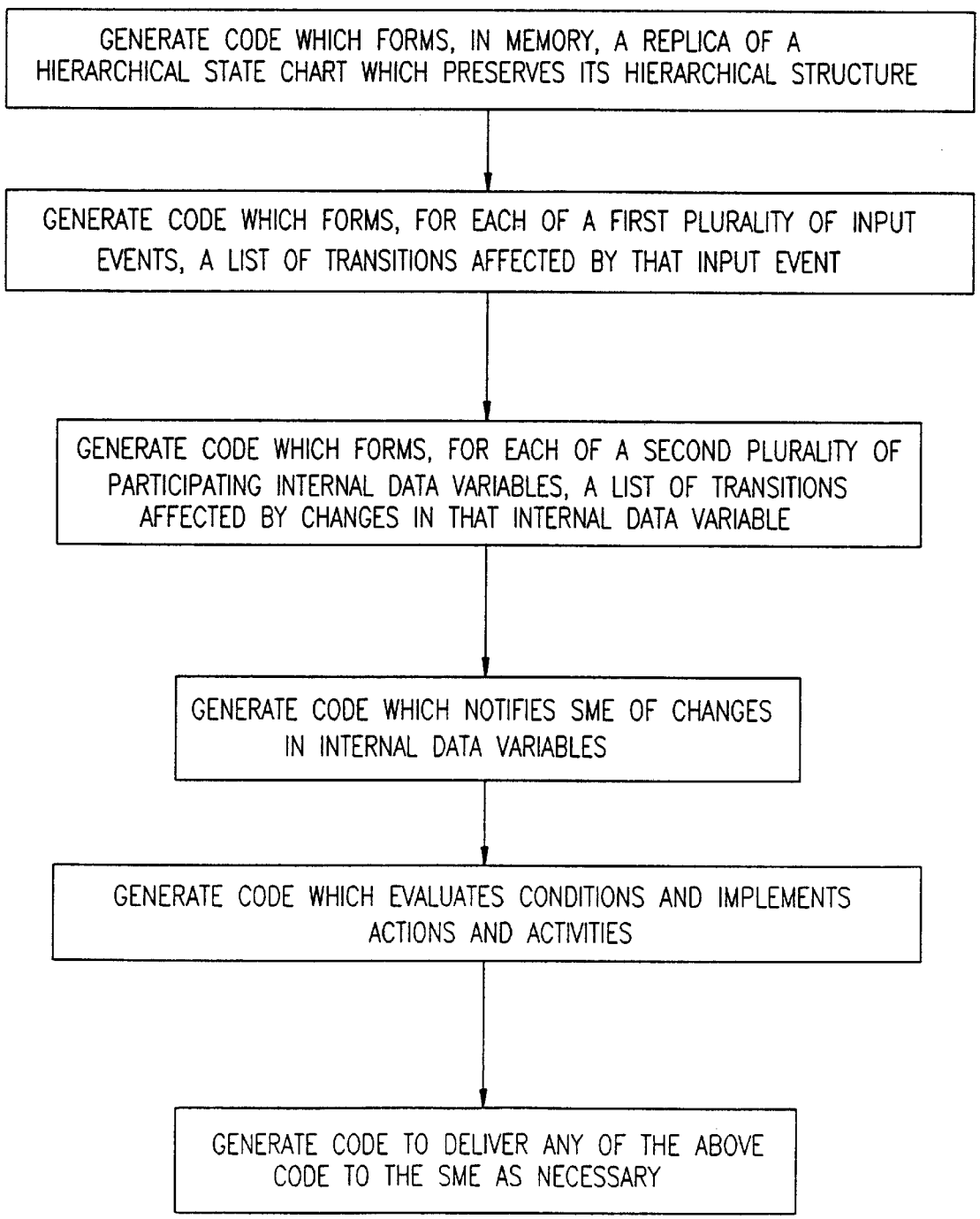
FIG. 7 is a simplified flowchart illustration of an automatic code generation technique operative in accordance with a preferred embodiment of the present invention.

Reference is now made to FIG. 7 which is a simplified flowchart illustration of a automatic code generation technique operative in accordance with a preferred embodiment of the present invention. The resulting code is useful in conjunction with a state machine engine which performs the following functions, inter alia:

a. Upon receipt of notification that an input event has occurred, the SME accesses the list formed for that input event and evaluates each transition on that list to determine, depending on the current state, which transitions are to be performed.

b. Upon receipt of notification that an internal data variable has been changed, the SME accesses the list formed for that internal data variable and evaluates each transition on that list to determine, depending on the current state, which transitions are to be performed.

To perform a transition, the SME computes the new state associated with the transition by going to the destination of the transition and looking up and activating all ancestors. All children are also looked up and activated as appropriate, e.g. in accordance with predefined defaults. Those portions of the current state that are no longer active in the new state are deactivated. Elements in the new state that were not active in the current state are activated. The new state then becomes the current state and is stored in the SME.

Alternatively, one or both of the above lists may not be provided. For example, the system may poll periodically for internal events rather than being driven thereby. Alternatively or in addition, the system may poll periodically for external events rather than being driven thereby.

Logic in State Chart

RAPID APPLICATION: TRANSITN 12/12/96 16:07:32
MODE DATA REPORT

Parameters:
　Scope: Subtree.
　Order: Hierarchy.
　Includes: User Functions, Activities, Transitions, Triggers, Actions.

USER FUNCTIONS

1. MODE: transitn
Parent: none Type: root
Note:

2. MODE: A
Parent: transitn Type: exclusive

Entry Activities:
　a. LampA on

Exit Activities:
　a. LampA off

Transitions:
　a. Destination: B Entry type: Default
　　a1. Trigger: Default in &
　b. Destination: B Entry type: History
　　b1. Trigger: History in &
　c. Destination: B Entry type: Deep history
　　c1. Trigger: DeepHistory in &

3. MODE: B
Parent: transitn Type: exclusive

Transitions:
　a. Destination: A Entry type: Default
　　a1. Trigger: BToA in &

4. MODE: C
Parent: B Type: exclusive

5. MODE: E
Parent: C Type: exclusive

Entry Activities:
　a. LampE on

Exit Activities:
　a. LampE off

Transitions:
　a. Destination: F Entry type: Default
　　a1. Trigger: Next in &

6. MODE: F
Parent: C Type: exclusive

Entry Activities:
　a. LampF on

Exit Activities:
　a. LampF off

Transitions:
　a. Destination: G Entry type: Default
　　a1. Trigger: Next in &

7. MODE: D
Parent: B Type: exclusive

8. MODE: G
Parent: D Type: exclusive
Entry Activities:
　a. LampG on

Exit Activities:
　a. LampG off

Transitions:
　a. Destination: H Entry type: Default
　　a1. Trigger: Next in &

9. MODE: H
Parent: D Type: exclusive

Entry Activities:
　a. LampH on

Exit Activities:
　a. LampH off

Transitions:
　a. Destination: E Entry type: Default
　　a1. Trigger: Next in &

Generated Code

Header File
```
#ifndef __include__transitn
define __include__transitn include "applic.h"
include "task.h"
#include "object.h"
#include "mode.h"
class Application;
class myApplication;

typedef bool (myApplication:: *MyApplicationMethod)();

#define cNumberDependencies 8
#define cNumberDependencyIndices 6
#define cNumberChildren 18
#define cNumberObjects 20
#define cNumberTriggers 5
#define cNumberTransitions 8
#define cNumberModes 9
define cNumberActivities 10 class myApplication: public Application
    {
    private:
      // Objects
      enum objectID
        {
        cOB_RootObject=0,
```

```
//PushButtons
cOB_Default, //1
cOB_History, //2
cOB_DeepHistory, //3
cOB_BToA, //4
cOB_Next, //5
//Lamps
cOB_LampA, //6
cOB_LampE, //7
cOB_LampF, //8
cOB_LampG, //9
cOB_LampH, //10
//Modes
cOB_RootMode, //11
cOB_ModeA, //12
cOB_ModeB, //13
cOB_ModeC, //14
cOB_ModeD, //15
cOB_ModeE, //16
cOB_ModeF, //17
cOB_ModeG, //18
cOB_ModeH //19
};

enum modeID
{
cMO_RootMode=0,
cMO_ModeA, //1
cMO_ModeB, //2
cMO_ModeC, //3
cMO_ModeD, //4
cMO_ModeE, //5
cMO_ModeF, //6
cMO_ModeG, //7
cMO_ModeH, //8
};

enum ActivityIndices
{
cAC_ModeA_entry,
cAC_ModeA_exit,
cAC_ModeE_entry,
cAC_ModeE_exit,
cAC_ModeF_entry,
cAC_ModeF_exit,
cAC_ModeG_entry,
cAC_ModeG_exit,
cAC_ModeH_entry,
cAC_ModeH_exit,
};

enum ConcreteIndices
{
eConcrete1=0,
cConcrete2,
cConcrete3,
cConcrete4,
cConcrete5,
cConcrete6,
cConcrete7,
cConcrete8,
cConcrete9,
cConcrete10,
};
public:
```

```
void init (RapidTask *t);

// Objects:
RootObject rootObject;
PushButton pbDefault;
PushButton pbHistory;
PushButton pbDeepHistory;
PushButton pbNext;
PushButton pbBToA;
RapidLamp LampA;
RapidLamp LampE;
RapidLamp LampF;
RapidLamp LampG;
RapidLamp LampH;
// Modes:
RootMode rootMode;
XMode ModeA;
XMode ModeB;
XMode ModeC;
XMode ModeD;
XMode ModeE;
XMode ModeF;
XMode ModeG;
XMode ModeH;

// Logic Methods:
bool ModeA_entry();
bool ModeA_exit();
bool ModeE_entry();
bool ModeE_exit();
bool ModeF_entry();
bool ModeF_exit();
bool ModeG_entry();
bool ModeG_exit();
bool ModeH_entry();
bool ModeH_exit();

// Dynamic State Machine Data:
RapidObject *FrameTable[cNumberObjects];
ModeP buffer1[cNumberModes];
ModeP buffer2[cNumberModes];
ModeP buffer3[cNumberModes];

unsigned char_ModeFlags[3*cNumberModes][1];

// Static State Machine Data:
// Each object has a list of dependency records, sorted
// by property and event, and referencing pairs of
// (modes, activity/condition, index), or a transition index
static DependencyRecord dependencies
    [cNumberDependencies];
// For each object/property pair, there is a dependency
    index record
// that includes the first & last dependency record per-
    taining to the
// object/property pair.
static DependencyIndexRecord dependencyIndicies
    [cNumberDependencyIndices];
```

```
// Each transition has an index and an associated record
   that includes
// the indices of the source and destination, type,
   condition, and action
static TransitionRecord transitionRecords
   [cNumberTransitions];

// Each transition has an index and an associated record
   that includes
// the indices of the source and destination, type,
   condition, and action
static TriggerRecord triggerRecords[cNumberTriggers];

// Activity methods are indexed through the following
   array
// subroutine methods are NOT indexed here.
static MyApplicationMethod activityRecords
   [cNumberActivities];

// Each mode record includes entry and exit activities, if
   any,
// and the start index and length of the mode activities.
   Can the mode activities
// be merged? Also, the number of transitions, to facilitate
   flag allocation.
static ModeRecord modeRecords[cNumberModes];

// Each object record includes
static ObjectRecord objectRecords[cNumberObjects];

// Array to hold all of the children for the objects
static int childrenArray[cNumberChildren];

// General Data on this APplication static ApplicationRecord applicationRecord;
};

class myTask : public RapidTask
   {
   public:
      myTask();
      ~myTask()
         {
         removeContext(&_mainApp);
         };

private:
      myApplication _mainApp;
   };
#endif

Body File

/*
Rapid Application:

Objects:
   Transitn
      |-->BToA (Square Pushbutton)
      |-->Default (Square Pushbutton)
      |-->History (Square Pushbutton)
      |-->DeepHistory (Square Pushbutton)
      |-->Next (Square Pushbutton)
      |-->LampA (Round Lamp)
      |-->LampE (Round Lamp)
      |-->LampF (Round Lamp)
      |-->LampG (Round Lamp)
      |-->LampH (Round Lamp)

Modes:
   Transitn
   |-->A (D)
   |
   |--B
      |-->C(D)
      | |-->E(D)
      | |
      | |--F
      |
      |--D
         |-->G(D)
         |
         |--H
Logic:
1. MODE: Transitn
   Parent: none Type: root
   Note:

2. MODE: A
   Parent: Transitn Type: exclusive

Entry Activities:
      a. LampA on

Exit Activities:
      a. LampA off

Transitions:
      a. Destination: B Entry type: Default
         a1. Trigger: Default in &
      b. Destination: B Entry type: History
         b1. Trigger: History in &
      c. Destination: B Entry type: Deep History
         c1. Trigger: DeepHistory in &

3. MODE: B
   Parent: Transitn Type: exclusive

Transitions:
      a. Destination: A Entry type: Default
         a1. Trigger: BToA in &

4. MODE: C
   Parent: B Type: exclusive

5. MODE: D
   Parent: B Type: exclusive

6. MODE: E
   Parent: C Type: exclusive

Entry Activities:
      a. LampE on

Exit Activities:
      a. LampE off
```

Transitions:
   a. Destination: F Entry type: Default
      a1. Trigger: Next in &

6. MODE: F
Parent: C Type: exclusive

Entry Activities:
   a. LampF on

Exit Activities:
   a. LampF off

Transitions:
   a. Destination: G Entry type: Default
      a1. Trigger: Next in &

6. MODE: G
Parent: D Type: exclusive

Entry Activities:
   a. LampG on

Exit Activities:
   a. LampG off

Transitions:
   a. Destination: H Entry type: Default
      a1. Trigger: Next in &

6. MODE: H
Parent: D Type: exclusive

Entry Activities:
   a. LampH on

Exit Activities:
   a. LampH off

Transitions:
   a. Destination: E Entry type: Default
      a1. Trigger: Next in &

Generated Code:
*/

```
#include "transitn.h"

#include "emtrace.h"

#include "ekernel.h"

/*
struct DependencyRecord
{
    DependencyClass dependencyclass; // event, condition,
        mode activity
    int mode; // Frame Table index
    int eventID; // eventID, if any
    int index; // Index of transition or mode Activity
};
*/

DependencyRecord myApplication::dependencies
    [cNumberDependencies]=
{
    {cEvent, cOB_ModeA, cPushButtonIn, 0}, // 0 A->B
        on Default in
    {cEvent, cOB_ModeA, cPushButtonIn, 1}, // 1 A->B
        on History in
    {cEvent, cOB_ModeA, cPushButtonIn, 2}, // 2 A->B
        on DeepHistory in
    {cEvent, cOB_ModeB, cPushButtonIn, 0}, // 3 B->A
        on BToA in
    {cEvent, cOB_ModeE, cPushButtonIn, 0}, // 4 E->F
        on Next in
    {cEvent, cOB_ModeF, cPushButtonIn, 0}, // 5 F->G
        on Next in
    {cEvent, cOB_ModeG, cPushButtonIn, 0}, // 6 G->H
        on Next in
    {cEvent, cOB_ModeH, cPushButtonIn, 0}, // 7 H->E
        on Next in
};

/*
struct DependencyIndexRecord{
    PropertyEntry_propertyId;
    int flags=0;
    unsigned int_firstElement;
}
*/

DependencyIndexRecord
    myApplication::dependencyIndicies
    [cNumberDependencyIndices]={
    {cSelf, 0, 0}, // pbDefault self
    {cSelf, 0, 1}, // pbHistory self
    {cSelf, 0, 2}, // pbDeepHistor self
    {cSelf, 0, 3}, // pbBToA self
    {cSelf, 0, 4}, // pbNext self
    {cNone, 0, cNumberDependencies} // Sentinel for last
        index record
};

// children listed grouped by common parent
int myApplication::childrenArray[cNumberChildren]=
    {
        cOB_Default, // 0
        cOB_History, // 1
      cOB_DeepHistory, // 2
        cOB_BToA, // 3
        cOB_Next, // 4
      //Lamps
        cOB_LampA, // 5
        cOB_LampE, // 6
        cOB_LampF, // 7
        cOB_LampG, // 8
        cOB_LampH, // 9
      //Modes
        cOB_ModeA, // 10
        cOB_ModeB, // 11
        cOB_ModeC, // 12
        cOB_ModeD, // 13
        cOB_ModeE, // 14
        cOB_ModeF, // 15
        cOB_ModeG, // 16
        cOB_ModeH // 17
    };

/*
struct ObjectRecord
```

```
{
ObjectIdentifier name;
int parent;
int id; // Id within type . . . e,g, modes are numbered
    1-n, concretes are numbered 1-m
int numChildren;
int firstChild;
int firstDependentIndex;
int numDependentIndex;
};
*/
```

```
ObjectRecord myApplication::objectRecords[cNumberObjects]=
{
{"rootObject",  cNone,            cNone,       10,    0,     0,        0},
                cOB_RootObject,   cConcrete1,  0,     cNone, 0,
1},
                cOB_RootObject,   cConcrete2,  0,     cNone, 1,
1},
                                  cConcrete3,  0,     cNone, 2,
1},
                cOB_RootObject,   cConcrete5,  0,     cNone, 3,
1},
                cOB_RootObject,   cConcrete4,  0,     cNone, 4,
4},
                                  cConcrete6,  0,     cNone, 0,
0},
                                  cConcrete7,  0,     cNone, 0,
0},
                                  cConcrete8,  0,     cNone, 0,
0},
                                  cConcrete9,  0,     cNone, 0,
0},
                                  cConcrete10, 0,     cNone, 0,
0},
                                  cMO_RootMode, 7,    11,    0,
0},
                                  cMO_ModeA,    0,    cNone, 0,
0},
                                  cMO_ModeB,    6,    10,    0,
0},
{"ModeC",       cOB_ModeB,        cMO_ModeC,    2,    14,    0,        0},
{"ModeD",       cOB_ModeB,        cMO_ModeD,    2,    16,    0,        0},
                                  cMO_ModeE,    0,    cNone, 0,
0},
                                  cMO_ModeF,    0,    cNone, 0,
0},
                                  cMO_ModeG,    0,    cNone, 0,
0},
                                  cMO_ModeH,    0,    cNone, 0,
0}
};
```

```
ApplicationRecord myApplication::applicationRecord=
{
cNumberModes,
cNumberActivities
};

/*
struct TriggerRecord
    {
    int objectID;
    int propertyID;
    int eventID;
    };
*/

// NOTE: Could get sophisticated, and reuse trigger
records . . .
```

```
TriggerRecord myApplication::triggerRecords
[cNumberTriggers]=
{
{cOB_Default, cSelf, cPushButtonIn}, // 0
{cOB_History, cSelf, cPushButtonIn}, // 1
{cOB_DeepHistory, cSelf, cPushButtonIn}, // 2
{cOB_BToA, cSelf, cPushButtonIn}, // 3
{cOB_Next, cSelf, cPushButtonIn}, // 4
};
/*
```

```
struct TransitionRecord
    {
    int triggerStart; // index of first trigger record
    int triggerLength; // number of trigger records
    int sourcemode; // object index of source mode
    int destinationMode; // object index of destination
        mode
    int condition; // index of condition method
    int action; // index of action method
    unsigned int type:3;
    unsigned int IsConditionOnly: 1;
    unsigned int toAncestor: 1;
    unsigned int toDescendant: 1;
    unsigned int sourceEqualsDestination: 1;
    };
*/
```

```
TransitionRecord myApplication::TransitionRecords[cNumberTransitions]=
{
{0, 1, cOB_ModeA, cOB_ModeB, cNone, cNone, cDefaultTransition,      false, false, false,
false },// A->B #1
{1, 1, cOB_ModeA, cOB_ModeB, cNone, cNone, cHistoryTransition,      false, false, false,
false},// A->B #2
{2, 1, cOB_ModeA, cOB_ModeB, cNone, cNone, cDeepHistoryTransition, false, false, false,
false},// A->B #3
{3, 1, cOB_ModeB, cOB_ModeA, cNone, cNone, cDefaultTransition,      false, false, false,
false},// B->A #1
{4, 1, cOB_ModeE, cOB_ModeF, cNone, cNone, cDefaultTransition,      false, false, false,
false},// E->F #1
{4, 1, cOB_ModeF, cOB_ModeG, cNone, cNone, cDefaultTransition,      false, false, false,
false},// F->G #1
{4, 1, cOB_ModeG, cOB_ModeH, cNone, cNone, cDefaultTransition,      false, false, false,
false},// G->H #1
{4, 1, cOB_ModeH, cOB_ModeE, cNone, cNone, cDefaultTransition,      false, false, false,
false},// H->E #1
};
```

```
/*
    struct ModeRecord
    {
        ObjectIdentifier name;
        int defaultChildID; //ObjectID of default child, cNone
            if none
            // For parents of AndModes, first child
        int entry;
        int exit;
        int modeActivityStart;
        int numModeActivities; // N/A, condition index, activ-
            ity index
        int transitionStart; // First transition record pertaining to
            this mode
        int numTransitions; // Number of transitions
    };
*/
```

```
bool myApplication::ModeA_entry()
{
    LampA.turn_on(); // LampA on
    return false;
}
bool myApplication: ModeA_exit()
{
    LampA.turn_off(); // LampA off
    return false;
} bool myApplication::ModeE_entry()
{
    LampE.turn_on(); // LampA on
    return false;
}
```

```
ModeRecord myApplication::modeRecords[cNumberModes]=
        //def  child      entry                exit              modeStart  numMode       transSart
        numTrans
{"RootMode",  cOB_ModeA,  cNone,               cNone,            cNone,     0,            cNone,  0},
{"ModeA",     cNone,      cAC_ModeA_entry,  cAC_ModeA_exit,  cNone,     0,            0,      3},
{"ModeB",     cOB_ModeC,  cNone,               cNone,            cNone,     0,            3,      1},
{"ModeC",     cOB_ModeE,  cNone,               cNone,            cNone,     0,            cNone,  0},
{"ModeD",     cOB_ModeG,  cNone,               cNone,            cNone,     0,            cNone,  0},
{"ModeE",     cNone,      cAC_ModeE_entry,  cAC_ModeE_exit,  cNone,     0,            4,      1},
{"ModeF",     cNone,      cAC_ModeF_entry,  cAC_ModeF_exit,  cNone,     0,            5,      1},
{"ModeG",     cNone,      cAC_ModeG_entry,  cAC_ModeG_exit,  cNone,     0,            6,      1},
{"ModeH",     cNone,      cAC_ModeH_entry,  cAC_ModeH_exit,  cNone,     0,            7,      1}
};
```

```
MyApplicationMethod myApplication::activityRecords
    [cNumberActivities]=
{
    &myApplication::ModeA_entry,
    &myApplication::ModeA_exit,
    &myApplication::ModeE_entry,
    &myApplication::ModeE_exit,
    &myApplication::ModeF_entry,
    &myApplication::ModeF_exit,
    &myApplication::ModeG_entry,
    &myApplication::ModeG_exit,
    &myApplication::ModeH_entry,
    &myApplication::ModeH_exit,
};
```

```
bool myApplication::ModeE_exit()
{
    LampE.turn_off(); // LampA off
    return false;
} bool myApplication::ModeF_entry()
{
    LampF.turn_on(); // LampA on
    return false;
}
```

```
bool myApplication::ModeF_exit()
  {
  LampF.turn_off(); // LampA off
  return false;
  } bool myApplication::ModeG_entry()
  {
  LampG.turn_on(); // LampA on
  return false;
  } bool myApplication::ModeG_exit()
  {
  LampG.turn_off(); // LampA off
  return false;
  } bool myApplication::ModeH_entry()
  {
  LampH.turn_on(); // LampA on
  return false;
  } bool myApplication::ModeH_exit()
  {
  LampH.turn_off(); // LampA off
  return false;
  } void myApplication::init (RapidTask *t)
  {
  setTask(t);
  Application::dependencies=dependencies;
  Application::dependencyIndicies=dependencyIndicies;
  Application::transitionRecords=transitionRecords;
  Application::triggerRecords=triggerRecords;
  Application::activityRecords=(ApplicationMethod
     *)activityRecords;
  Application::objectRecords=objectRecords;
  Application::modeRecords=modeRecords;
  Application::objects=FrameTable;
  Application::applicationRecord=&applicationRecord;
Application::children=childrenArray;

rootObject.init(cOB_RootObject, this);

pbDefault.init(cOB_Default,this);
pbHistory.init(cOB_History,this);
pbDeepHistory.init(cOB_DeepHistory,this);
pbBToA.init(cOB_BToA,this);
pbNext.init(cOB_Next,this);
LampA.init(cOB_LampA,this);
LampE.init(cOB_LampE,this);
LampF.init(cOB_LampF,this);
LampG.init(cOB_LampG,this);
LampH.init(cOB_LampH,this);

rootMode.init(cOB_RootMode, this,
    _ModeFlags[(3*cMO_RootMode)],
    _ModeFlags[(3*cMO_RootMode)+1],
    _ModeFlags[(3*cMO_RootMode)+2]);
ModeA.init (cOB_ModeA, this,
    _ModeFlags[(3*cMO_ModeA)],
    _ModeFlags[(3*cMO_ModeA)+1],
    _ModeFlags[(3*cMO_ModeA)+2]);
ModeB.init (cOB_ModeB, this,
    _ModeFlags[(3*cMO_ModeB)],
    _ModeFlags[(3*cMO_ModeB)+1],
    _ModeFlags[(3*cMO_ModeB)+2]);
ModeC.init (cOB_ModeC, this,
    _ModeFlags[(3*cMO_ModeC)],
    _ModeFlags[(3*cMO_ModeC)+1],
    _ModeFlags[(3*cMO_ModeC)+2]);
ModeD.init (cOB_ModeD, this,
    _ModeFlags[(3*cMO_ModeD)],
    _ModeFlags[(3*cMO_ModeD)+1],
    _ModeFlags[(3*cMO_ModeD)+2]);
ModeE.init (cOB_ModeE, this,
    _ModeFlags[(3*cMO_ModeE)],
    _ModeFlags[(3*cMO_ModeE)+1],
    _ModeFlags[(3*cMO_ModeE)+2]);
ModeF.init (cOB_ModeF, this,
    _ModeFlags[(3*cMO_ModeF)],
    _ModeFlags[(3*cMO_ModeF)+1],
    _ModeFlags[(3*cMO_ModeF)+2]);
ModeG.init (cOB_ModeG, this,
    _ModeFlags[(3*cMO_ModeG)],
    _ModeFlags[(3*cMO_ModeG)+1],
    _ModeFlags[(3*cMO_ModeG)+2]);
ModeH.init (cOB_ModeH, this,
    _ModeFlags[(3*cMO_ModeH)],
    _ModeFlags[(3*cMO_ModeH)+1],
    _ModeFlags[(3*cMO_ModeH)+2]);

rootMode.initActiveChild();
ModeA.initActiveChild();
ModeB.initActiveChild();
ModeC.initActiveChild();
ModeD.initActiveChild();
ModeE.initActiveChild();
ModeF.initActiveChild();
ModeG.initActiveChild();
ModeH.initActiveChild();

_currentState.init(buffer1,cNumberModes);
_nextState.init(buffer2,cNumberModes);
_tempState.init(buffer3,cNumberModes);
Application::rootMode=&rootMode;
Application::rootObject=&rootObject;
  } myTask::myTask()
  {
  _mainApp.init(this);
  setMainApplication(&_mainApp);
  setupKernelTask (this);
  };

// declare one task
myTask GlobalTask;
```

It is appreciated that the software components of the present invention may, if desired, be implemented in ROM (read-only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

We claim:

1. Apparatus implementing hierarchical state charts and comprising:

a state machine engine (SME) operative to carry out repertoires of behaviors of a system;

a state chart encoder operative to replicate, in computer code form, a user-defined hierarchical state chart describing a repertoire of behaviors of said system, said encoder being operative to preserve said state chart's hierarchical structure intact in a first data structure;

an event list generator operative to generate, for each individual event from among a plurality of events within the repertoire, a list of at least one transition between states of said state chart which are associated with said individual event, said event list generator being operative to preserve said list in a second data structure; and a behavior implementer operative to activate said system to carry out each of the behaviors in its repertoire.

2. Apparatus according to claim 1 wherein said system comprises at least one of hardware and software.

3. Apparatus according to claim 1 wherein said first data structure's size increases linearly in direct proportion to the number of branches in said hierarchical structure.

4. Apparatus according to claim 1 wherein said second data structure's size increases linearly in direct proportion to the number of transitions in said list of at least one transition.

5. Apparatus according to claim 1 wherein the order of said at least one transition of each of said lists corresponds to the order of evaluation of said transitions as defined by said hierarchical state chart.

6. Apparatus according to claim 1 wherein said plurality of events for which said event list generator generates lists comprises at least one external input event.

7. Apparatus according to claim 1 wherein said plurality of events for which said event list generator generates lists comprises at least one internal data value change event, the apparatus also including a data value change event notifier operative to generate a notification to the state machine engine of each data value change event.

8. A method implementing hierarchical state charts, the method comprising:

providing a state machine engine (SME) operative to carry out repertoires of behaviors of a system;

replicating, in computer code form, a user-defined hierarchical state chart describing a repertoire of behaviors of said system, said replicating step being operative to preserve said state chart's hierarchical structure intact;

generating, for each individual event from among a plurality of events within the repertoire, a list of at least one transition between states of said state chart which are associated with said individual event; and activating said system to carry out each of the behaviors in its repertoire.

9. An automatic code generation method comprising:

automatically generating code which forms, in memory, a replica of a hierarchical state chart which preserves said chart's hierarchical structure;

automatically generating code which forms, for each of a first plurality of input events, a list of transitions affected by that input event;

automatically generating code which forms, for each of a second plurality of internal data variables, a list of transitions affected by changes in that internal data variable;

automatically generating code which notifies the state machine engine of changes in internal data variables; and automatically generating code which evaluates conditions and implements actions and activities.

10. A method according to claim 9 and comprising the step of providing a state machine engine operative, upon receipt of notification regarding occurrence of an event, to evaluate a list of transitions affected by said event so as to select transitions to be performed, and to perform said transitions.

11. A method for computing a state for a hierarchical state machine, the method comprising:

providing a state machine engine operative to receive notification regarding occurrence of at least one event;

providing a hierarchical state chart describing a repertoire of behaviors of a system;

providing a list of at least one transition between states of said state chart for each of said events with which said at least one transition is associated;

evaluating said list of at least one transition so as to select a transition to be performed in response to said at least one event; and evaluating said hierarchical state chart to compute the state that corresponds to said selected transition.

* * * * *